United States Patent [19]
Kimura

[11] Patent Number: 5,242,000
[45] Date of Patent: Sep. 7, 1993

[54] COMBINED BEAD PORTION AND RIM ARRANGEMENT FOR TIRE

[75] Inventor: Katsuo Kimura, Kobe, Japan

[73] Assignee: Sumitomo Rubber Industries, Ltd., Hyogo, Japan

[21] Appl. No.: 834,847

[22] Filed: Feb. 13, 1992

Related U.S. Application Data

[63] Continuation-in-part of Ser. No. 677,248, Mar. 29, 1991, abandoned.

[30] Foreign Application Priority Data

Mar. 30, 1990 [JP]  Japan .................... 2-85221

[51] Int. Cl.$^5$ .............................. B60B 21/02
[52] U.S. Cl. ............... 152/381.3; 152/379.3; 152/DIG. 20; 301/95
[58] Field of Search .............. 152/379.3, 379.5, 381.3, 152/380, DIG. 20; 301/95, 96, 97, 98, 99

[56] References Cited

U.S. PATENT DOCUMENTS

| | | | |
|---|---|---|---|
| 480,595 | 8/1892 | Lehmann | 152/381.3 X |
| 606,378 | 6/1898 | Dages | 152/DIG. 20 |
| 1,150,223 | 8/1915 | Overman | 152/384 |
| 2,126,223 | 8/1938 | Schwinn | 152/381.3 X |
| 3,915,215 | 10/1975 | Nebout | 152/384 X |
| 4,169,496 | 10/1979 | Cataldo | 152/DIG. 20 |
| 4,745,958 | 5/1988 | Kresta | 152/540 |

FOREIGN PATENT DOCUMENTS

| | | |
|---|---|---|
| 30170 | 10/1977 | Australia . |
| 0154693 | 9/1985 | European Pat. Off. . |
| 0163625 | 12/1985 | European Pat. Off. . |
| 190039 | 11/1906 | Fed. Rep. of Germany . |
| 3420402 | 12/1985 | Fed. Rep. of Germany . |
| 637271 | 4/1928 | France ..................... 152/401 |
| 153102 | 10/1983 | Japan . |
| 19853 | of 1891 | United Kingdom ............ 152/381.3 |
| 24320 | of 1895 | United Kingdom ............ 152/379.3 |
| 27697 | of 1897 | United Kingdom ............ 152/379.3 |
| 22300 | of 1898 | United Kingdom ............ 152/379.3 |
| 5971 | of 1905 | United Kingdom . |

*Primary Examiner*—Russell D. Stormer
*Attorney, Agent, or Firm*—Birch, Stewart, Kolasch & Birch

[57] ABSTRACT

A tire, a wheel rim and assembly thereof in which the tire includes a pair of sidewalls each having a lower sidewall and a bead including a circumferentially extending hoop or bead core characterised by the bead extending laterally outwards of the tire to define with the lower sidewall a groove opening in the laterally outward direction and to form a space between the bead and a rim well portion of the wheel rim. The wheel rim included a pair of laterally inwardly projecting tire engaging members, each having a bead seat and the radially inner surface thereof. The tire, the rim and the assembly are light weight and easy to assemble.

6 Claims, 6 Drawing Sheets

2

COMBINED BEAD PORTION AND RIM ARRANGEMENT FOR TIRE

CROSS-REFERENCE TO RELATED APPLICATION

This is a continuation-in-part of application Ser. No. 677,248 filed on Mar. 29, 1991 now abandoned.

BACKGROUND OF THE INVENTION

1. Field of the Invention

The present invention relates to a combined bead portion and rim arrangement tire and a 2. Description of Related Art FIG. 3 shows a conventional radial tire in which a bead 52 on one side of a tire T is in engagement with a rim R on the same side. Another bead portion and another rim on the other side which are not shown in the drawing are arranged symmetrically with the illustrated side. The rim R has a bead seat 50 extending in a direction going away from the rim cross sectional center plane RC, and a flange 51 standing at the distal part of the bead seat 50 and being curved outwardly. The bead 52 is formed adjacent to and on a line extended from a sidewall portion 53 of the tire T. In FIG. 3, the numeral 54 represents bead wires, the numeral 55 represents an apex which is a layer of hard rubber or the like, and the numeral 56 represents a bead filler which is a layer of reinforcing cords or the like.

In such a conventional tire bead to rim structure, the bead 52 of the tire T is engaged on the bead seat 50 of the rim R and supported in a sideward direction by the flange 51, and brought into close contact with the bead seat by internal pressure P in the tire T, and this enables the seat to maintain internal pressure P so that the required function of the tire T can be successfully exhibited. For this purpose, the tire T has the apex 55 made of, for example, hard rubber and disposed usually at a location radially outside of the bead wires 54 in order to maintain the tire sectional shape to provide the lateral rigidity, and additionally the tire construction usually comprises the bead filler 56 enclosing the apex 55.

However, the above mentioned conventional construction has drawbacks explained below. Firstly, the bead portion 52 needs to have a substantial volume to ensure lateral rigidity, and accordingly the components such as the apex 55, the bead filler 56 and the like need to be large, Secondly, the whole internal pressure P of the tire T is acted on by the bead wires 54 through the tire casing, and accordingly the bead wires 54 need to have high strength. These requirements require substantial tire weight and a number of production steps, and leads to the problem of a uniform vulcanization or cure of the tire, becoming difficult to achieve.

A modified type of tire-rim engagement has been proposed wherein the bead portions of the tire in cross section additionally have a laterally-outwardly-formed ridge made of solid hard rubber. The bead seat of the rim on this tire has in cross section a distal part which defines a concave space to accomodate the ridge in such a manner that all the radially inward surface of the bead portion and the radially inward, the laterally outward, and radially outward surfaces of the ridge are brought into close contact with, the bead seat of the rim. The bead seat may also have a rib at a laterally inner location to prevent the engaged bead of the tire from moving laterally inward to become out of engagement with its seating.

However this modified type of tire-rim engagement has the following drawbacks. Firstly, the weight of the bead portion is increased because of the additional solid hard rubber ridge. Secondly, a tight dimensional tolerance of the bead portion is required because the bead portion is designed to be in contact with the bead seat in three directions, i.e. radially inwards, laterally outwards and radially outwards, and simultaneously with the rib on the bead seat, when the bead portion is brought into engagement with the rim. Thirdly, the assembly work of the tire and the rim requires extra time and labour to engage the solid hard rubber ridge.

Further, with respect to fixation of a bead of a tire to a rim, there have been proposed various kinds of fixation as can been seen in, for example, British patent No. 22300 by Griffith, British patent No. 5971 by Veith, U.S. Pat. No. 480,595 and German patent No. 190039. These patents disclose tire and rim assemblies wherein beads extend laterally outwards of the tire and rims have portions extending laterally inward direction.

However, in the above tire and rim assemblies, the fixation of the tire to rim is carried out by mechanical engagement (i.e. such fixation that is performed by engagement between a projection and a concaved portion or a recess). Accordingly, in such an arrangement, assembly of a tire and a rim cannot be carried out if the rim is not separable or if the tire is not made of very soft material. When the rim is separable, the fixation of the tire to the rim becomes weak or unstable, and the operation of assembly becomes time-consuming.

An object of the invention is to solve the problems mentioned above and to provide a tire and a rim having a construction that is not only simple, but also small in volume and light in weight. Also, the number of bead wires is reduced, no additional degrees of tolerance are required, the assembly can maintain a safe running capability even in an air-loss condition, and the tire is easy to assemble with the rim.

SUMMARY OF THE INVENTION

According to one aspect of the present invention a tire comprises a lower sidewall and a bead including a circumferentially extending hoop or bead core characterized by the bead extending laterally outwards of the tire to define an annular groove opening in the laterally outward direction and to form a space between the bead and a rim well portion of a wheel rim to be adapted to the tire.

In this specification the laterally outward direction means a direction going away from the sectional center plane of a tire or a rim, while the laterally inward direction means a direction opposite to the laterally outward direction. Preferably the bead has a wheel engaging bead base on a radially outer surface of the bead. This surface provides a bead base which may be tapered with an inclination of −5° to 20° degrees with reference to the wheel axle.

Another aspect of the invention provides a wheel rim comprising a disc for attachment to a vehicle hub or axle having a pair of laterally inwardly projecting tire engaging members (i.e. annular ridges), and a space between a rim well portion of the wheel rim and a bead of a tire to be adapted to the rim. Rim bead seats may be provided on a radially inner surface of the tire engaging members and these seats may be tapered at between −5° and 20° degrees with reference to the wheel axle.

A third aspect of the invention provides a tire and wheel rim assembly comprising the above tire and wheel.

In the assembly the annular groove having a hooked sectional shape defined by the bead portion and the sidewall lower portion of the tire are brought into contact with the bead seat and optionally a flange of the rim. Thus the bead portion is pressed from the radially outside so that the bead portion is retained by the configurational engagement with the bead set. The bead seat supporting similar may be a disc or a disc with a well provided at the periphery of the disc, or any combination thereof.

The present invention can be described also by the following expression.

A tire of the present invention employs a structure in which a bead portion is formed so as to extend toward a laterally outward direction from a lower end of a lower portion of a sidewall so that the lower portion of the sidewall and the bead portion define an annular groove opening toward the laterally outward direction, and a space is formed between the bead and a rim well portion of a wheel rim to be adapted to the tire.

A rim of the present invention, designed to be engaged with the tire of the present invention, comprises a disc and a bead seat supported at one side by the periphery of the disc, said bead seat being formed so as to extend toward a laterally inward direction from the supported side to another side and to form a space between a rim well portion of the wheel rim and a bead of the tire.

Another rim of the present invention, designed to be engaged with the tire of the present invention, further comprises a radially outwardly curved flange extended from the laterally inward side of the bead seat, the flange coming in contact with a part of the outer surface of the tire side wall.

BRIEF DESCRIPTION OF THE DRAWINGS

Embodiments of the invention will now be described by way of example only, in conjunction with the attached drawings included.

DETAILED DESCRIPTION OF PREFERRED EMBODIMENTS

Hereinafter, the present invention is explained in detail with reference to the accompanying drawings.

Figure 1:
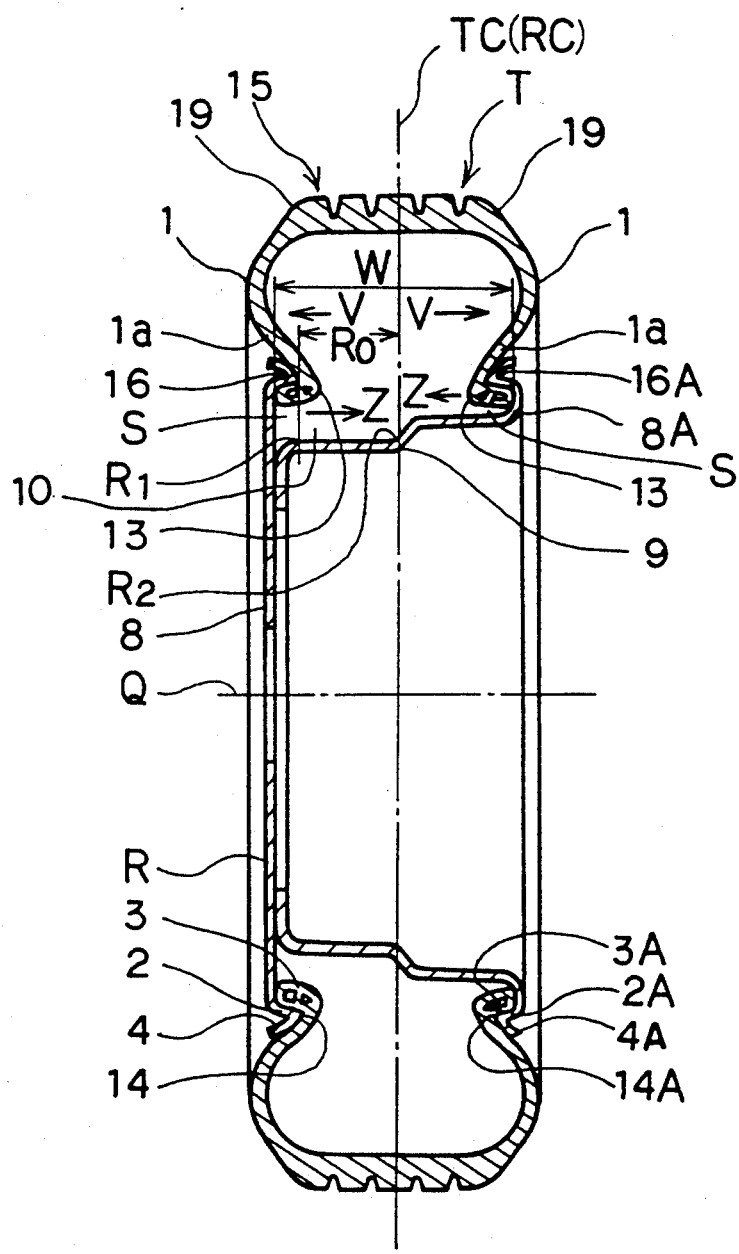
FIG. 1 is a sectional view of a tire and a rim of the present invention.
Figure 2A:
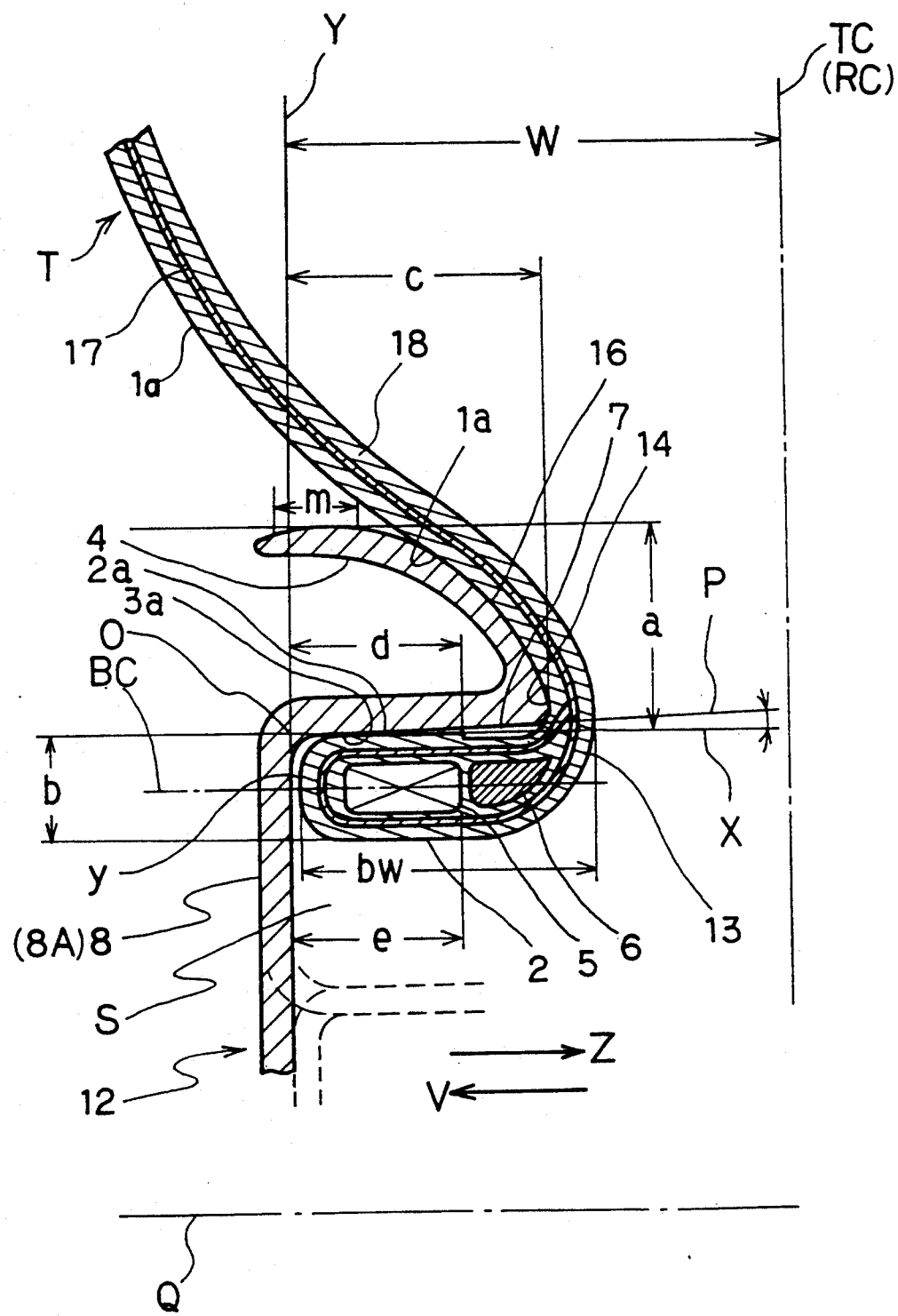
FIG. 2A is an enlarged sectional view showing part of the embodiment of FIG. 1.

In FIG. 1 showing an embodiment of an assembly of a tire T and a rim, R in accordance with the present invention and FIG. 2A giving an enlarged view showing the major part of the embodiment, the rim R is formed by bead seat 3, 3A, discs 8, 8A having a round plate or a stamped round plate portion, the discs directly supporting the bead seats 3, 3A, flanges 4, 4A and a cylinder portion (well portion) 9. At the outer peripheries of the discs 8, 8A, there are provided annular ridges 16 projecting toward the laterally inward direction i.e. a direction Z approaching the rim sectional center plane RC for engaging with the bead portions of the tire T.

In other words, in FIGS. 1 & 2A a rim R is formed by two metal discs 8 and 8A which provide bead seats 3 and 3A, flanges 4 and 4A and a well 10. At the outer peripheries of the discs 8, 8A, there are provided annular ridges 16 projecting laterally inwardly in the direction Z.

Figure 2B:
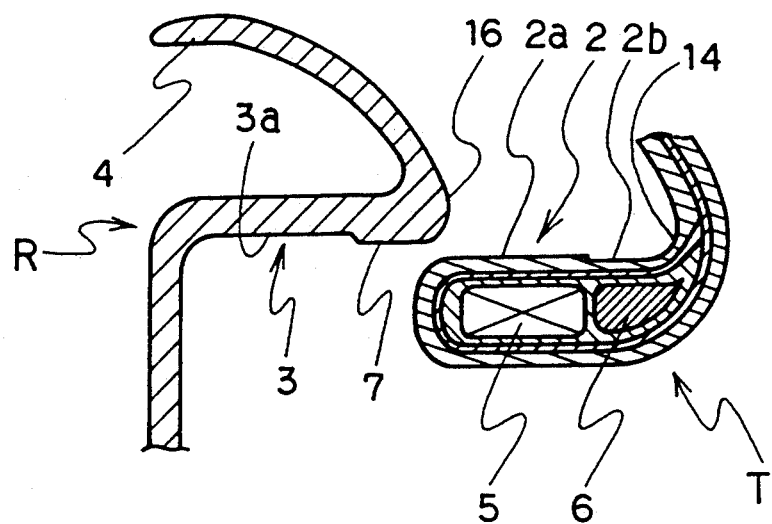
FIG. 2B is an exploded sectional view showing part of the embodiment of FIG. 1 for an explanatory purpose.

FIG. 2A and FIG. 2B are enlarged views showing the bead portion 2 and the rim R on one side of the embodiment of FIG. 1. Another bead portion and another rim on the other side are symmetrical with the illustrated side except for the rim well portion, and therefore are not shown in the drawings. In the drawings the tire T has on one side a sidewall 1, a bead 2 and an intermediate region 13 between a lower portion 1a of the sidewall 1 and the bead portion 2. The sidewall 1 is inclined in a direction approaching the tire sectional center plane TC, and the sidewall 1 changes its direction laterally outwardly at the intermediate region 13 so that the bead 2 projects in a direction V away from the tire sectional center plane TC or tire equator i.e. in a laterally outward direction. The bead 2 and the lower portion 1a of the sidewall 1 extend in different directions crossing each other, and form an annular groove 14 opening towards the laterally outward direction, i.e. the direction V going away from the tire sectional center plane TC. The bead 2 comprises circumferentially extending bead wire reinforcements 5 having a relatively flat cross sectional configuration and an apex (a rubber filler) 6 having a relatively small size. Further it can be seen that the bead center line BC has a nearly parallel relationship with the tire lateral datum line PO.

The rim R has its ridges 16 shaped to provide a bead seat 3a, having a nearly cylindrical shape extending in the laterally inward direction Z (the direction approaching the rim sectional center plane RC) from the radially outer periphery of the disc 8, 8A, and a flange 4 having a radially outwardly curved shape which continuously extends from the laterally inward end of the bead seat 3 for supporting at least a part of the outer surface of the sidewall lower portion 1a of the tire. The annular ridge 16 functions as an engaging member.

Alternatively, in another embodiment the rim R has the bead seat 3 but does not have a flange 4. In such an arrangement the tire is required to have a reinforced structure in which an increased endurance is given to the intermediate region 13 between the sidewall lower portion 1a and the bead portion 2.

Thus, the annular ridge 16 to be engaged with the bead portion is projecting in the laterally inward direction Z approaching the rim sectional center plane RC. Additionally it can be seen that, at a location close to the laterally inward end of the bead seat 3, the rim R has an annularly formed hump portion 7 which is slightly projecting in the radially inward direction. On the other hand, the bead portion 2 has a corresponding annular recess 2b retreating radially inwardly. As shown in FIG. 2B illustrating an exploded sectional view of the major part for the explanatory purpose, the annular recess which is slightly retreating in the radially inward direction is formed on a bead base 2a on the side of the tire sectional center plane TC. When the tire T is brought into engagement with the rim R, the hump portion 7 of the rim R is caught in the recess 2b of the tire T while an annular inside surface 3a of the bead seat 3 of the rim R comes in contact with the bead base 2a of the bead portion 2 of the tire T.

Alternatively, in another embodiment the bead seat 3 does not have a hump portion 7 and the bead portion 2 does not have a recess 2b.

Figure 3:
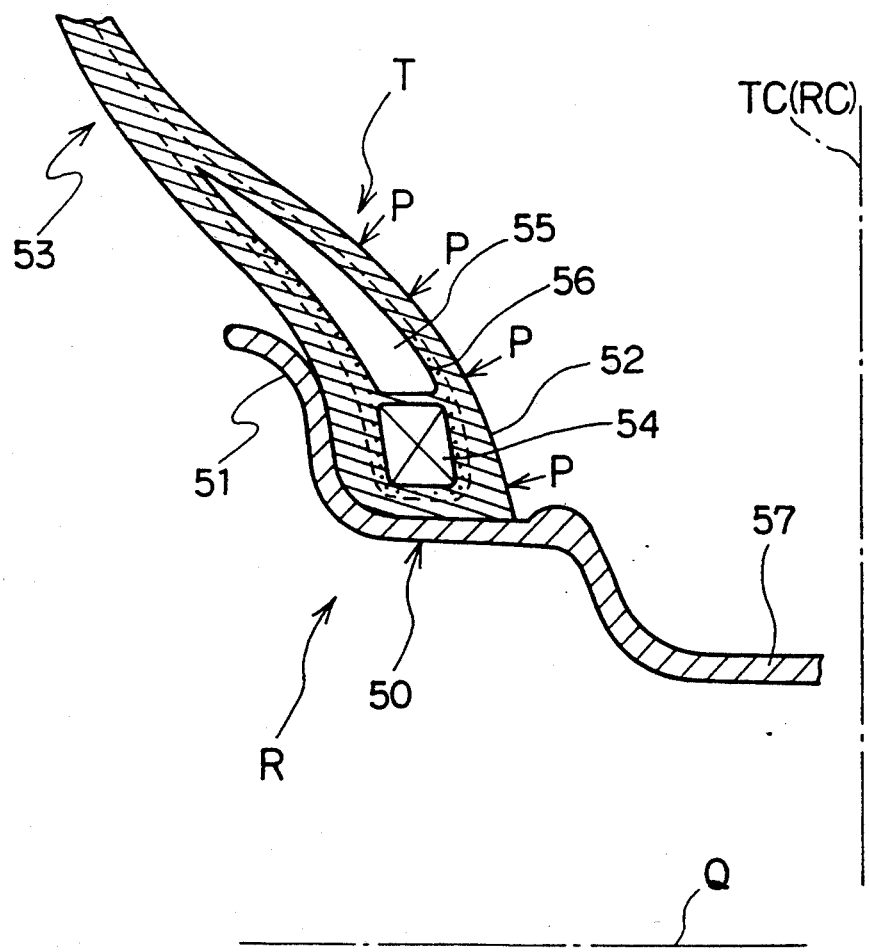
FIG. 3 is a sectional view showing a part of a prior art bead and bead seat.

In a prior art rim shown in FIG. 3, the engagement of the tire T with the rim R is achieved by seating the bead portion 52 of the tire T on a bead seat 50 of the rim R and by supporting the bead portion 52 in the lateral direction by means of the flange 51. In contrast, the tire T and the rim R of the present invention employs a structure clearly shown in FIG. 1, FIG. 2A and FIG. 2B in which at the outer peripheries of the discs 8, 8A, there are provided annular ridges 16, 16A projecting toward the laterally inward direction i.e. a direction Z approaching the rim sectional center plane RC for engaging with the bead portions 2 of the tire T, while the bead portions 2, 2A and the lower portions 1a, 1aA of the sidewall 1 form annular grooves 14, 14A opening toward the laterally outward direction, i.e. the direction V going away from the tire sectional center plane TC. By virtue of this arrangement, the bead base 2a of the annular groove 14 of the tire T is engaged with the annular inside surface 3a of the bead seat 3 of the annular ridge 16 adaptable to the bead portion, and the sidewall lower portion 1a is supported by the flange 4. The bead portion 2 of the tire T is held down from above by the bead seat 3 of the rim R apparently because a diameter of the bead base 2a of the bead portion 2 of the tire T is a little larger than a diameter of the inside surface 3a of the bead seat 3 of the rim R. The diameter of the bead base 2a is preferably larger than the inside surface 3a by 0.2 to 2 mm in the case of general tires for automobiles. Thanks to this difference in diameter of the bead portion 2 and the bead seat 3, the more secure engagement by the pressing can be obtained. The bead portion 2 and the bead seat 3 are kept into tight contact with each other by the internal pressure of the tire T when the tire is inflated. Thus the annular inside surface 3a of the bead seat 3 of the rim R supports in the radially inward direction the bead base 2a of the bead portion 2 of the tire and this provides a seal.

In FIG. 1 and FIG. 2A, the reference S shows a gap or a space between the rim well portion and the bead portion 2 set at the bead seat, and the reference y shows a gap or a space between the discs 8, 8A and the bead portion set at the bead seat. These spaces make the tire-rim assembly and disassembly work easy.

The maximum height "a" of the flange 4 is preferably five times as large as the thickness "b" of the bead portion, i.e. $a \leq 5b$. If the flange height "a" is selected outside this range, it becomes difficult to assemble the tire with the rim.

In FIG. 2A, the lateral datum line X representing the bead seat diameter is perpendicular to the radial datum line Y corresponding to the plane of the disc. Passing through the intersecting point O of these two datum lines, a straight line P is defined so that the line P represents the annular inside surface 3a of the bead seat 3. In order to exhibit more effectively the advantage of the present invention, an angle defined by the datum line X and the line P preferably satisfies the relationship: $-5°$ degrees $<$ angle XOP $< 20°$ degrees. The angle XOP corresponds to the angle of inclination of the conventional bead seat. In case of the angle XOP $\leq -5°$ degrees, it becomes difficult for the bead portion 2 to reach the bead seat 3 crossing over the hump portion 7. On the other hand, in case of the angle XOP $\geq 20°$ degrees, the tire-rim engagement becomes insufficient and the seal becomes inadequate. Therefore, it is desirable to set the angle XOP in accordance with the afore-mentioned relationship.

Figure 5A:
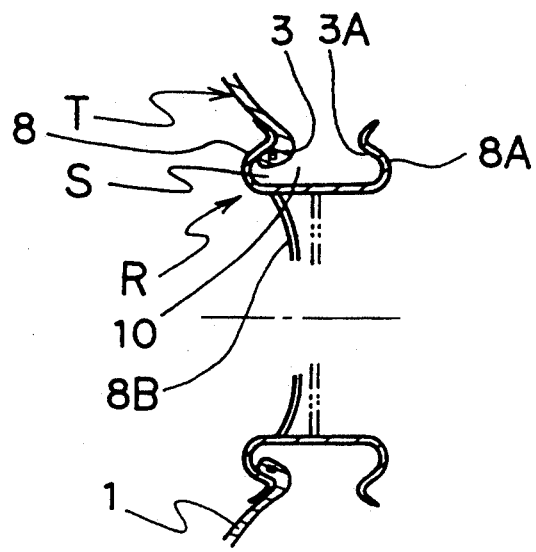
FIGS. 5A to 5D are sectional views respectively showing different embodiments of the rim of the present invention.
Figure 5B:
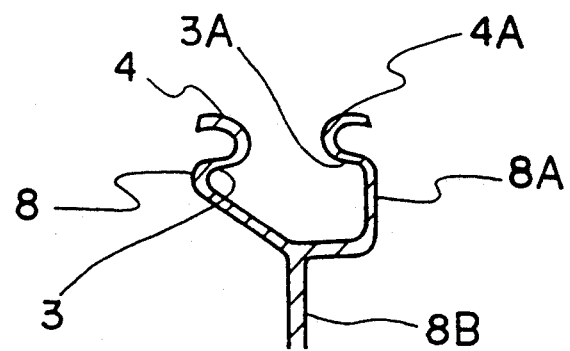
Figure 5C:
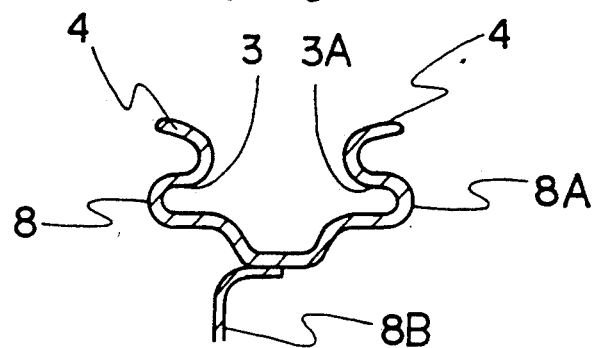
Figure 5D:
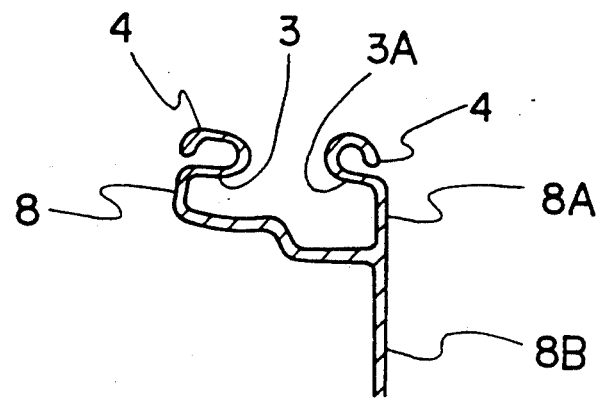

With respect to the shape of the disc 8, as far as the disc 8 satisfies the minimum requirement for the space S in the well 10 which is required for the assembly work, there can be employed any shape, thus for example, a disc type illustrated by the solid lines in FIG 2A and by the solid line in FIG. 1, a rim type illustrated by broken lines in FIG. 2A, or an integral type illustrated in FIG. 5A or other types shown in FIGS. 5B to 5D can be used. In FIGS. 5A to 5D, it is shown that a disc 8 may have a radially inner late member 8B. The space S is required to be provided on at least one of right and left sides under the bead portions 2, 2.

The width $R_0$ of the well portion 10 (FIG. 1) must be larger than the bead width bW (FIG. 2I). The width $R_0$ is defined as a distance between the point $R_1$ and the point $R_2$ in FIG. 1, wherein the point $R_1$ is the intersecting point of the vertical line downwardly drawn from the laterally inside end of the annular ridge 16 of the rim and the well portion 10, while point $R_2$ is opposite to the point $R_1$.

In FIG. 2, the reference "c" represents the lateral distance from the datum line Y (the inside surface of the disc 8) to a portion where the bead side is turned up to be connected to the flange which is the nearest portion from the rim center plane RC, the reference "d" represents the lateral distance from the datum line Y to the laterally outside end of the hump portion 7, and the reference "e" represents the lateral distance from the datum line Y to a portion of the bead wires 5 nearest from the tire center plane TC. The width of the hump portion 7 is preferably determined approximately in accordance with the formula: $0.5 \leq d/c \leq 0.9$, more preferably $0.6 \leq d/c \leq 0.7$. The location of the bead wire 5 is preferably designed in accordance with the formula: $d > e$. Because such a design allows the bead base 2a of the tire enclosing the bead wires 5 to be set at the annular inside surface 3a of the bead seat 3 being located on the laterally outside of the hump portion 7 of the rim R, and consequently ensures the engagement enough to prevent an undesired derimming of the tire T.

The hump portion 7 preferably has a radial height of 1.0 mm to 1.5 mm. Such a height is effective in preventing the bead portion 2 from undesirably moving.

The rim width W is preferably selected in accordance with the formula: $(1/15)W \leq c \leq (1/5)W$. Such a rim width W ensures reliable engagement and easy assembly of the tire and the rim. If the annular ridge width "c" is smaller than $(1/15)W$, the tire-rim separation becomes likely to occur. On the contrary, if the width "c" is too large relative to the rim width W, assembling the tire with the rim becomes difficult. In case that the tire is to be used as a safety tire, the tire is required to be designed with a small rim width W and consequently a bead seat width "c" to be selected is equal to or near the maximum i.e. $(1/5)W$.

The bead thickness "b" is preferably as small as possible in order to make the present invention yield the maximum advantage. Therefore, it is preferable to make the bead wires 5 in thin and elongated (flat) shape in cross section as shown in FIG. 2I by employing a strand/turn structure (for example 8×4, 8×3, 6×3 or the like), and to increase the mutually pressing area between the bead base 2a and the annular inside surface 3a of the bead seat 3. The bead wires 5, having an elongated shape and being positioned side by side, ensure an increased reliability of the engagement of the bead portion with the bead seats.

Further, the internal pressure of the tire in the casing can be born through the casing by the bead seat 3, as well as by the bead wires 5, and therefore the number of wires in the bead wires 5 can be reduced.

Since the bead volume is small in this manner, a uniformly thin thickness can be employed for the structure from the bead portion to the tire buttress 19 (refer to FIG. 1), in which a casing ply 17, a sidewall 1 with a uniform thickness and an inner liner 18 form a structure extending approximately from a region where the bead portion 2 crosses the lateral datum line X and become to rise to another region in the upper portion of the sidewall 1. Thus, by minimizing the thickness of the sidewall 1 to give a uniform thickness, the tire is light in weight and this allows more uniform vulcanization.

The components of the bead portion can be reduced in number and therefore the structure of the bead portion can be simplified. Because, in accordance with the present invention, the minimum components required for a sufficient structure of the bead portion are: the bead wire 5 to bear the tire internal pressure and to hold the gentle casing line at the sidewall lower portion; the rubber layer 6 adjacent to the bead wires 5; and single or plural casing plies. The rubber filler 6 is required for the purpose of filling the space between the bead wire and the casing ply, and therefore the rubber filler 6 does not necessarily have rigidity.

If the present invention is intended to be applied to a safety tire capable of running to a certain degree in the event of air-loss incurred during running, the rim width W is to be as small as possible. Thereby, the tire is allowed to run even in air-loss condition because it is allowed to run on the road with the flange 4 mounted on the tread 15 and the folded sidewall. In addition, taking the running in the air-loss condition into consideration, the flange 4 is designed to have a part (the part "m" in FIG. 2I) in nearly parallel to the lateral datum line X. In the embodiment of FIG. 2A, the part "m" is formed in a circular arc shape and the center of the circular arc is located on the radial datum line Y which is also the datum line for the rim width. The radius of the circular arc is preferably larger than the annular ridge width "c" for a better air-loss running performance. Alternatively the part "m" may be formed in a straight shape.

Figure 6:
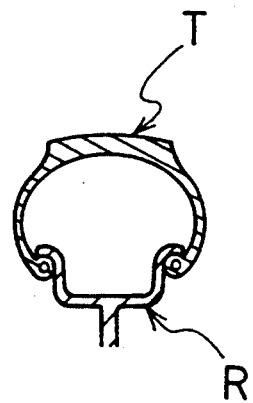
FIG. 6 is a sectional view showing a further prior art structure known as the Continental Tire System or CTS.

The present invention can be applied to any tire belonging to almost all categories, for example a passenger car tire, a light truck tire, a truck or bus tire, an industrial tire and the like. Particularly in case the present invention is applied as a radial safety tire for a passenger car, the wheel according to the present invention is advantageous compared with a so-called Continental Tire System illustrated in FIG. 6, because the wheel according to the present invention provides easy and reliable tire-rim assembly, sufficient protection for the sidewall 1, and improved performance with respect to disassembly from the disc 8.

The embodiment of FIG. 1 employs in combination the disc 8 of a flat plate shape on the outside and the cylinder 9 of a deep drawn bowl shape on the inside. Therefore, when the tire T is assembled with the rim R, the assembly work is easily carried out at the periphery of the disc. In addition the well 10 can be made shallow.

Figure 4A:
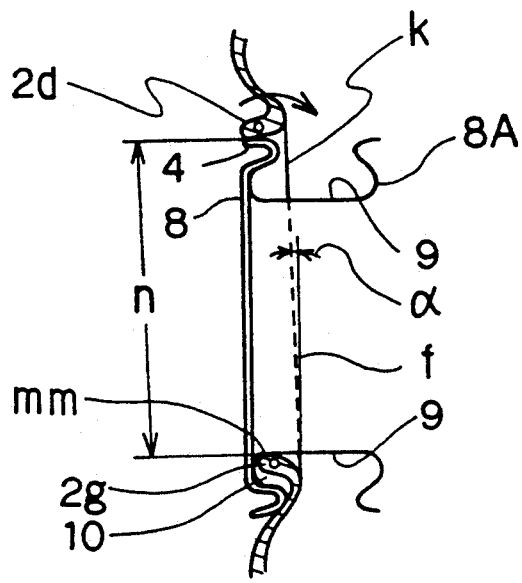
FIG. 4A is an explanatory view of an assembly of the tire and the rim of the present invention.
Figure 4B:
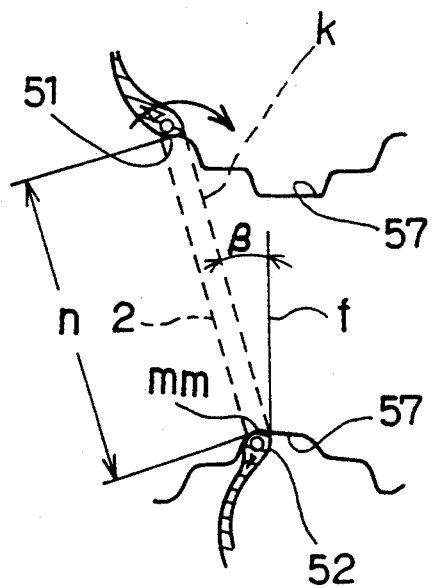
FIG. 4B is an explanatory view of an assembly of a prior art tire and a prior art rim.

With regard to this, FIG. 4A and FIG. 4B give schematic views respectively show the assembly works of the wheel according to the present invention and of a prior art wheel.

In FIG. 4A there is shown an angle $\alpha$ defined by a line "f" parallel with the rim sectional center line and a laterally inward contour "k" of the bead heel when one part of the bead portion is located at a point "mm" keeping the bead to bead distance shortest when the opposite part of the bead portion passes over the opposite rim flange. Similarly in FIG. 4B there is shown an angle $\beta$ defined by the line "f" parallel with the rim sectional center line and a laterally inward contour "k" of the bead heel when one part of the bead portion is located at a point "mm" in the well keeping the bead to bead distance shortest when the opposite part of the bead portion passes over the opposite rim flange.

The angle $\alpha$ at the time of tire-rim assembly in accordance with the present invention is near to 0 degree which is small compared with the angle $\beta$ of tire-rim assembly in prior art wheel. The reference "n" is a length required for the bead portion to pass over the rim flange, for example in FIG. 4A, a length between the lower end 2g and the upper end 2d of the bead portion when the lower end 2d falls into the well 10 and the upper end 2d passes over the rim flange 4.

Assuming the length "n" is identical in both FIG. 4A and FIG. 4B, the diameter of the bead portion capable of passing over the rim flange 4 or 51 and providing successful engagement can be made larger in the arrangement of the present invention (the difference is n × ($\cos \alpha - \cos \beta$)) and a larger diameter facilitates the tire-rim assembly work.

Or in other words, in case of a rim of the present invention and a prior art rim both having the same flange diameter, the required inside diameter of the annular bead portion to pass over the rim flange of the present invention is smaller (the difference is the flange diameter × ((1/cos $\beta$) − (1/cos $\alpha$))) and accordingly the present invention facilitates the tire-rim assembly work.

While in the arrangement according to the present invention shown in FIG. 4A the bead portion can go over the opposite flange 4 in a plane almost close to the disc 8 (at small inclination), in the prior art arrangement shown in FIG. 4B the bead portion 52 must be fallen into the well portion 57. Thus, it can be understood that the prior art arrangement needs a comparatively large angle $\beta$ and as a result makes the tire-rim assembly work difficult.

Additionally the arrangement shown in FIG. 1 has another advantage that freedom in the structural design or the ornamental design is broadened.

It should be noted that the present invention is not limited the described embodiments but various modification can be made on for example the entire wheel configuration as far as the modification does not deviate from the gist of the present invention.

Because of the construction described hereinbefore, the present invention provides the following advantages.

(1) According to the present invention, the bead portion of the tire is held down from above only by the bead seat of the rim to give a tight seal and thus the force caused by the inner pressure is supported at the bead seat by the bead wires, which leads to a reduced and smaller number of the bead wires. The tire weight can be made light because the structure of the bead portion 2 is simple, the bead volume is small and the sidewall can be made thin. The bead can be made flat and small, and therefore the volumne of the bead portion can be reduced considerably. The rising portion from the bead portion to the sidewall can also be thin because the rising portion thickness can consist of the casing thickness and the side rubber thickness. The lateral rigidity is ensured by the flange rising from the bead seat.

(2) The tire-rim assembly work is made easy. The laterally outside end of the bead portion is not in contact with the laterally inner surface of the rim disc, providing a gap "y", and a space "S" is left between the bead portion and the rim wall in the assembled condition as shown in FIG. 2A. The space helps to make the tire-rim assembly. Further, a shallow well can be employed. Therefore the rim can be made lightweight and the freedom of rim design is expanded. Namely, the tolerance of the configurational accuracy is liberalized, because the engagement is provided only between the bead seat and the bead portion, and a space is kept on the laterally outside and the radially inside of the bead portion.

(3) A undesired dislocation of the bead portion from the rim is effectively prevented particularly if the hump portion is provided on the bead seat.

(4) The run-flat capability is improved, because the sidewell lower portion is protected and reinforced by the flange. The assembly can continue running to a certain degree even in air-loss condition.

(5) There is no need for high turn up construction, in which the turned up end of the carcass ply is located at a higher position, because the bead seat with the flange and the bead wire press each other. This helps a weight reduction.

(6) Number of the components in the tire can be reduced because the bead structure is simple.

(7) The wheel is widely applicable for example to a low internal pressure wheel as well as to a high internal pressure wheel such as a wheel for aircraft use by changing the rim strength design as required.

I claim:

1. A combined bead portion and rim arrangement for a tire comprising:

a bead seat provided on said rim and extending substantially perpendicular to a center rim plane of said tire;

an annular notched surface formed within said bead seat;

an annular hump formed on said bead seat on an end of said bead seat facing an interior of said tire;

an annular ridge extending from said annular hump of said bead seat toward an exterior of said tire;

bead reinforcements and a bead apex formed within said bead portion and substantially parallel to said bead seat;

a bead base formed in said bead portion, said bead portion being positioned substantially parallel to said bead seat of said rim, wherein a diameter of the bead base of the bead portion is larger than a diameter of the annular notched surface of the bead seat provided on said rim;

an annular recess formed in said bead portion and adjacent said bead base; and an annular groove formed at an innermost edge of said bead portion with respect to the center rim plane of said tire;

wherein said annular notched surface said annular hump and said annular ridge interlockingly mate, respectively, with said bead base, said annular recess and said annular groove to securely seat said bead portion against said rim;

said rim arrangement including a first flat disc member parallel to the center rim plane of said tire and a second cylinder-shaped disc member fit within an inner peripheral surface and spaced apart from said bead portion, said cylinder-shaped disc member including an outer peripheral wall portion substantially parallel to said bead seat.

2. The tire of claim 1, wherein the bead has a radially outer surface and a wheel engaging bead base formed on the radially outer surface.

3. The tire of claim 2, wherein the bead base has an inclination or taper in the range of $-5°$ to $20°$ degrees to the axial direction.

4. The tire of caim 2, wherein the bead core is elongated in the lateral direction, being laterally wider than its radial thickness.

5. The tire of claim 2, wherein the sidewall thickness radially outside the bead core is substantially constant and no bead apex extends radially outside the bead core.

6. The tire of claim 2, wherein a recess is located laterally inwards of and adjacent to the bead base shaped to engage a bead retaining hump.

* * * * *